United States Patent [19]

Brock

[11] Patent Number: 5,111,047

[45] Date of Patent: May 5, 1992

[54] COLLISIONAL IONIZATION DETECTED ATOMIC RESONANCE FILTER

[75] Inventor: John C. Brock, Redondo Beach, Calif.

[73] Assignee: TRW Inc., Redondo Beach, Calif.

[21] Appl. No.: 587,828

[22] Filed: Sep. 21, 1990

[51] Int. Cl.$^5$ .............................................. H04B 10/06
[52] U.S. Cl. .................................. 250/336.1; 359/189; 250/374
[58] Field of Search ................... 250/336.1, 338.1, 374; 455/617, 619; 359/189, 193

[56] References Cited

U.S. PATENT DOCUMENTS

| | | | |
|---|---|---|---|
| 4,829,597 | 5/1989 | Gelbwachs | 250/361 C |
| 4,879,468 | 11/1989 | Brock | 250/374 |
| 4,986,655 | 1/1991 | Sweeney | 356/73 |

*Primary Examiner*—Carolyn E. Fields
*Attorney, Agent, or Firm*—Noel F. Heal; Sol L. Goldstein

[57] ABSTRACT

Apparatus and a related method for detecting signal photons of a selected wavelength using ionization induced by collisions between atomic or molecular particles. Signal photons raise the energy level of a proportion of particles introduced into a detection chamber to a selected metastable state. Optionally, a pump laser assists in raising the energy level of the particles to a metastable state close to the ionization continuum. Collisions between particles in the selected metastable state and particles of the buffer gas cause ionization of the metastable particles, and a measurable electrical current is obtained, without the need for strong electric fields for ionization, or the need for strong optical fields for photoionization. In a variant form of the invention, a second substance is admitted into the detection chamber. Collisions between the original atomic or molecular particles and particles of the second substance cause ionization of the second substance, again providing a measurable electric current from the free electrons or ions that are produced.

22 Claims, 8 Drawing Sheets

COLLISIONAL IONIZATION DETECTED ATOMIC RESONANCE FILTER

BACKGROUND OF THE INVENTION

This invention relates generally to techniques for selectively detecting photons and, more specifically, to techniques for detecting a weak omnidirectional and monochromatic photon signal by atomic resonance filtering. Atomic resonance filters are important components of laser communications receivers, but they have a relatively low throughput efficiency, or photon signal to photoelectron conversion efficiency. This low throughput efficiency can result from unfavorable quantum mechanics in the filter process, losses due to coupling of frequency-shifted photons out of the filter, and losses due to low quantum efficiency of a photocathode used in the detector.

One approach to narrow bandwidth filtering with wide acceptance angles is to use atomic absorption/fluorescence filters, such as are described in a paper by Marling et al., J. Appl. Phys. 50, 610 (1979). Atomic absorption/fluorescence narrow bandwidth infrared up-converters are described in a paper by Gelbachs et al., IEEE Trans. on Electron Devices, VOL ED-27, 99 (1980). The fluorescence principle is one of photon-to-photon conversion. Photons of a selected wavelength are converted by absorption and fluorescence to photons of another wavelength.

U.S. Pat. No. 4,600,840 to Chutjian discloses a filter employing a principle of electric field ionization. Signal photons are absorbed by atoms or molecules of a vapor in a detector cell, by which process the atoms or molecules are raised to a higher-energy metastable state. Then, by application of a powerful electric field, electrons are detached from the metastable particles, to produce ions and measurable electrons. The principal disadvantage of this approach is that a very large electric field, measuring several thousand volts per centimeter, is needed for ionization.

U.S. Pat. No. 4,879,468 to Brock, entitled "Photoionization Optical Filter and Detector," discloses a narrowband filter using a photoionization principle. Signal photons admitted into a detector cell selectively excite atoms or molecules of a vapor to a selected metastable state; then an illuminating laser photoionizes a large proportion of the metastable atoms or molecules, to produce measurable ions and electrons. No large electric field is needed for this process, but a laser is needed for ionization. The present invention provides an improvement over the photoionization filter, and needs neither a high electric field nor an ionizing laser.

SUMMARY OF THE INVENTION

The present invention resides in a narrow-bandwidth optical filter and detector, comprising a chamber containing a selected atomic or molecular vapor; means for admitting into the chamber signal photons of a particular wavelength to be detected, as well as photons of other wavelengths; an inert buffer gas admitted into the chamber, wherein collisions between the atomic particles of the buffer gas and the atoms or molecules in the metastable state cause ionization of a significant proportion of the atoms or molecules in the metastable state; and means for generating an electric field across the chamber and thereby collecting and detecting free electrons or ions as a measurable electric current proportional to the rate of admission of the signal photons. In the embodiment to be described, the metastable state is reached in two transitional steps, including a first transitional step from a ground state to an intermediate state, and a second transitional step from the intermediate state to the selected metastable state. The filter and detector further includes a pump photon source, for effecting transition of the atoms or molecules in the chamber through one of the two transitional steps. Transition through the other of the transitional steps is effected by the absorption of signal photons.

In one embodiment of the invention, the means for generating an electric field includes a segmented electrode, to provide a spatial image corresponding to the spatial relationship of the signal photons incident on the filter.

More specifically, in one disclosed example, the selected vapor is potassium and the buffer gas is argon. An optional feature of the filter is an optical prefilter positioned to limit incoming photons to those of a selected energy range.

In another disclosed embodiment of the invention, the detection chamber also contains a second substance admitted into the chamber, wherein collisions between particles of the second substance and the atoms or molecules in the metastable state cause ionization of a significant proportion of the particles of the second substance, which acts as an energy transfer partner. Energy of particles in the metastable state is transferred to particles of the second substance, which becomes ionized, and particles in the metastable state decay back to a lower-energy state.

In terms of a novel method, the invention comprises the steps of selecting an atomic or molecular system to provide absorption of signal photons of the desired wavelength; absorbing signal photons in a vapor cloud of the selected atomic or molecular system and thereby transforming atoms or molecules of the vapor from one state to a selected metastable state, in numerical proportion to the number of signal photons of the particular wavelength admitted into the chamber; admitting a second substance into the chamber, to cause ionizing collisions between atoms or molecules in the selected metastable state and particles of the second substance; and collecting the free electrons or ions that result from the ionizing collisions, to obtain an output current indicative of the rate of admission of the signal photons.

In one disclosed embodiment of the method, the the step of admitting a second substance includes admitting a buffer gas into the chamber, and the ionizing collisions between particles in the metastable state and particles of the buffer gas cause ionization of the particles in the metastable state. In another disclosed embodiment, the second substance admitted into the chamber is an energy transfer partner for the first selected substance, and the ionizing collisions between particles in the metastable state and particles of the second substance cause ionization of the particles in the second substance and energy decay of the first.

In the method as disclosed, the metastable state is reached by two atomic transitions, only one of which is effected by the step of absorbing signal photons, and the method further comprises the step of generating pump photons to effect the other atomic transition.

By way of example, the selected vapor may be potassium and the second substance may be cesium.

It will be appreciated from the foregoing that the present invention represents a significant advance in the field of atomic resonance filters and detectors. In particular, the invention provides for the detection of signal photons over a narrow bandwidth. The invention uses signal photons to raise atomic or molecular particles in a detection chamber to a selected metastable state, then relies solely on a collision process to produce ions and free electrons. A laser is optionally employed to assist in reaching the selected metastable state, which is close to the ionization continuum. Two mechanisms are disclosed for ionization by collision. In one, the metastable particles are ionized by collisions with particles of an inert buffer gas. In the other, particles collide with atoms or molecules of a second substance, which becomes ionized as a result. Other aspects and advantages of the invention will become apparent from the following more detailed description, taken in conjunction with the accompanying drawings.

DESCRIPTION OF THE PREFERRED EMBODIMENTS

As shown in the drawings for purposes of illustration, the present invention is concerned with an improved atomic resonance filter that uses collisional ionization to produce detectable electrons or ions. In the past, atomic resonance filters for detecting a narrowband omnidirectional optical signal have used either an absorption/fluorescence principle, or have used ionization induced by a powerful electric field, or photoionization requiring an ionizing laser.

In accordance with the present invention, signal photons raise atoms or molecules in a detector cell to a metastable state, and then collisions with particles of a buffer gas produce a significant number of ions and electrons, which are detectable by conventional means. A laser may be used to achieve part of the transition to the desired metastable state. In an alternative arrangement, another substance may be introduced into the chamber to act as an energy transfer partner with the metastable particles, which collide with and ionize the energy transfer partner to produce detectable electrons or ions.

Figure 1:
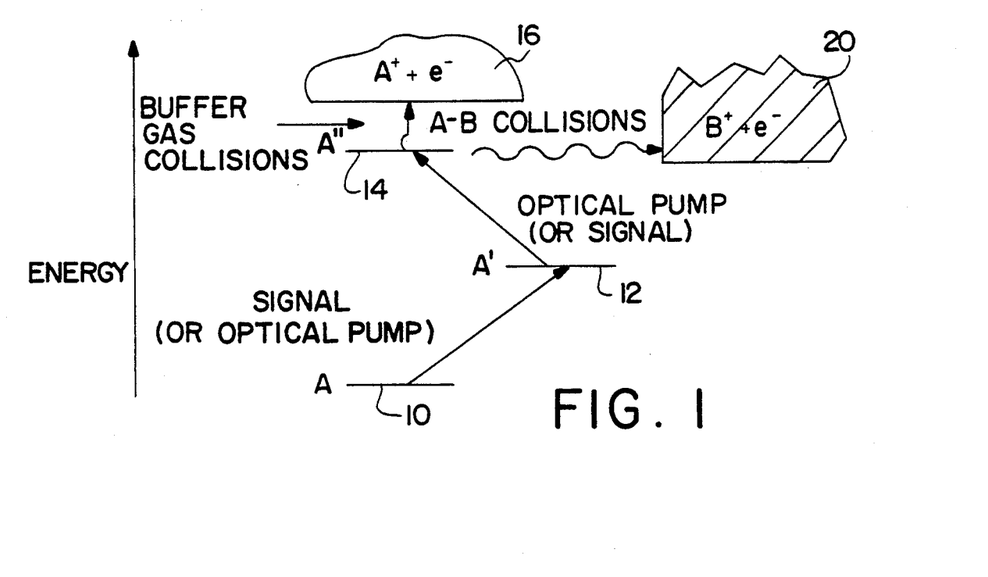
FIG. 1 is diagrammatic view showing the basic operating principle of the collisional ionization detected atomic resonance filter of the present invention.

The photon detection process of the invention is shown diagrammatically in FIG. 1. Atomic or molecular particles in a detector cell are initially in a natural or unexcited state referred to as the ground state, and indicated by a horizontal 10 line in FIG. 1. The symbol A next to the line indicates that the ground state is populated by an atomic species A. When a photon is absorbed by an atom initially at the ground state, the structure of electrons surrounding the nucleus of the atom is disturbed, and the atom makes a transition to an excited state, referred to as a metastable state. One of the metastable energy states, referred to by the symbol $A'$, is indicated at 12 in FIG. 1. Another, higher energy metastable state is indicated by the symbol $A''$ at 14.

If an atom absorbs sufficient energy in the form of photons, its energy state may be raised to the ionization state, in which a positive ion, referred to as $A^+$, is formed, along with a free electron. The ionization state is shown at 16 as a continuous region, and is referred to as the ionization continuum. A positive ion is an atom from which at least one electron has been removed, leaving a net positive charge, since the electron carries a negative charge. An energy transition to the ionization continuum differs from transitions to a metastable state in that sufficient energy has been transferred to the atom to dislodge an electron from it. In the metastable states, the electrons surrounding the atomic nucleus are still "bound" to the nucleus. In the ionization continuum, an electron is freed from its bound condition.

Either of the transitions $A—A'$ or $A'—A''$ can be used to provide a narrow bandpass filter for signal photons. The metastable transition, from A to $A'$ for example, will require the absorption of photons of a certain energy level (and therefore wavelength). Only the detection of photons of this wavelength will result in the population of the $A'$ metastable state. The other transition, for example from $A'$ to $A''$, may be effected by optical pumping, using a suitable laser as a photon source. In detectors that work on the fluorescence principle, photons emitted when the $A''$ state decays back to the ground state A, are detected by a photocathode. However, losses are incurred in this technique because of quantum mechanical losses, coupling of the fluorescent photons out of the detector, and low photocathode efficiency.

In the present invention, the higher metastable level $A''$ is selected to be relatively close to the ionization continuum 16. The metastable particles are involved in collisions with atoms of a suitable buffer gas introduced into the detector Many of these collisions can result in ionization of metastable $A''$-state particles. The electrons or ions produced by ionization collision are then collected and measured as an electric current that accurately reflects the rate of introduction of signal photons into the detector.

An alternative mechanism for the formation of ions by collision requires the introduction of a second species of particles into the detector. This is referred to in the figure as species B, the energy transfer partner of species A. Species B is selected to have an ionization continuum 20 at an energy level close to the energy level of metastable state $A''$. In the example shown, the ionization continuum of the B species begins at an energy level slightly below that of the $A''$ metastable level. Many collisions between the $A''$ particles and the B particles produce ions and electrons as follows:

$$A''+B=A+B^-+e^-.$$

As before, the electrons or ions can be collected and measured as a current indicative of the rate of introduction of signal photons into the detector.

Figure 2:
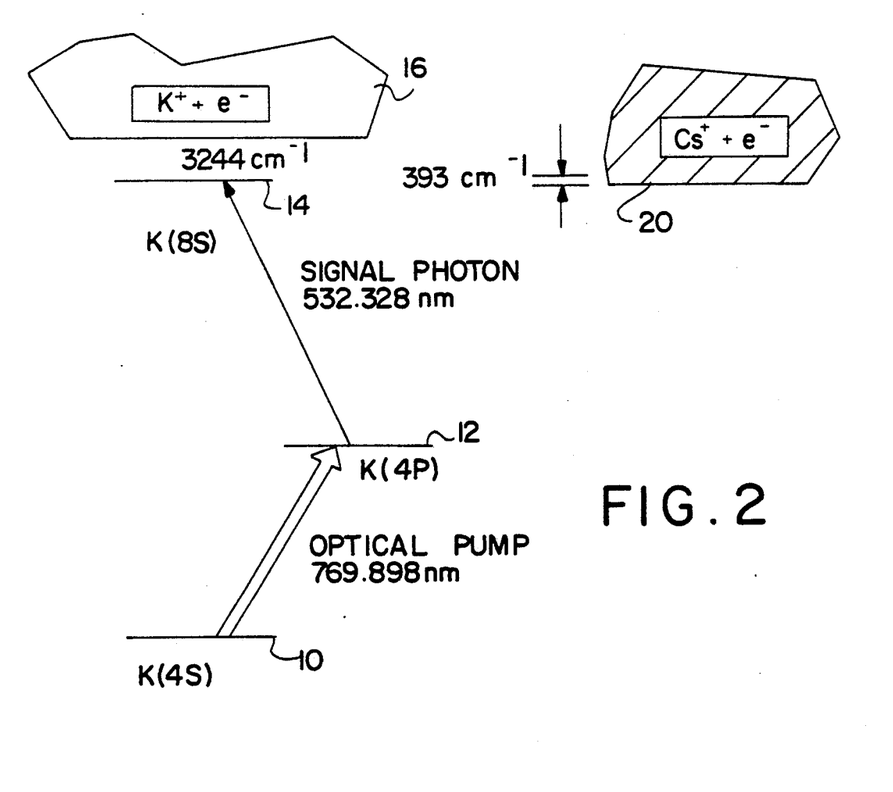
FIG. 2 is a diagrammatic view similar to FIG. 1, but giving specific examples of potassium vapor and (optionally) cesium gas in the detector cell.

A specific example of the energy transitions with which the invention is concerned is given in FIG. 2. Potassium (K) atoms at the ground state K(4S) are pumped to a first metastable state referred to as K(4P), using an optical pump at a wavelength of 769.898 nm (nanometers). Signal photons of wavelength 532.328 nm raise the energy level to a second metastable state indicated as K(8S). Thus the population of potassium atoms at this level depends explicitly on the intensity of signal photons at the desired frequency level.

Ionization then takes place as a result of collisions between the K(8S) atoms and atoms of a buffer gas, which is an inert gas such as argon. Alternatively, ionization occurs as a result of collisions between the potassium atoms at the K(8S) level and atoms of the second species B, cesium in this example, which is also introduced into the detector chamber. As a result of collisions of the latter type, the excited potassium atoms decay back to the ground state, and the cesium atoms are ionized to produce Cs+ and e- in the ionization continuum for cesium.

Figure 3:
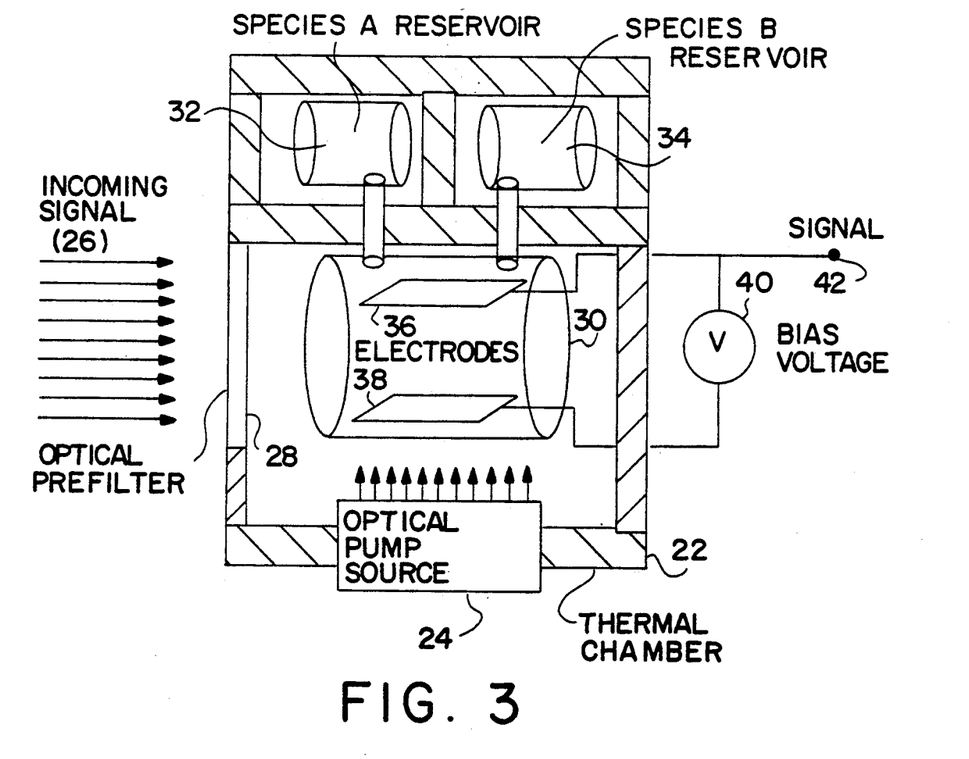
FIG. 3 is simplified view, partly in cross section, of a detector cell constructed in accordance with the present invention.

FIG. 3 is an example of a photon detection apparatus using the principle of the invention. The apparatus is housed in a thermally controlled chamber 22, in one wall of which is installed an optical pump source 24, in the form of a suitable laser. An incoming optical signal, indicated as 26 passes through an optical prefilter 28 in another wall of the chamber 22, and enters a detection chamber 30 in which are introduced substances of species A and species B from suitable reservoirs 32, 34 in compartments of the thermal chamber 22. Electrodes 36, 38 are also disposed in the detection chamber 30, and a bias voltage is applied from a source 40, to collect electrons produced as a result of collision-induced ionization. An output signal current is produced as indicated at 42.

The filter bandwidth of the detector is determined by the frequency response or "lineshape" of the transition effected by the signal photons. This may be the A—A' transition or the A'—A" transition, depending on the specific filter design. For some atomic or molecular vapors, there may be more than one significant metastable state from which collision ionization may take place. In other words, signal photons of two or more different wavelengths may be absorbed by atoms, which will subsequently be ionized by collision with other particles. Thus it is possible to configure the apparatus of the invention to function as a multichannel filter providing, in effect, multiple passbands for photons of different wavelengths. Alternatively, the apparatus may easily be adapted to operate as a single-channel device by incorporating a simple and inexpensive optical filter, such as the one shown at 28 in FIG. 3, to block photons except those with energies close to the desired signal photons. Photons at much lower energies that also result in meaningful transitions will be automatically "blocked," since they will result in metastable states of insufficient energy from which to produce ionization by collision.

Figure 4:
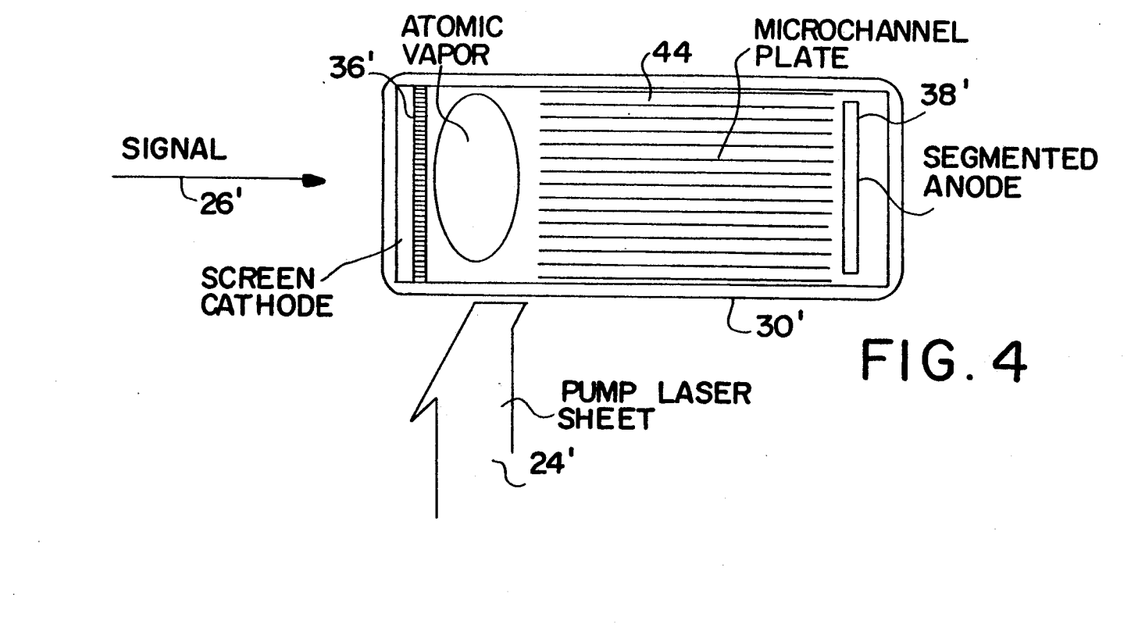
FIG. 4 is simplified view of an alternate form of the detector cell of the present invention, used for imaging a photon signal.

FIG. 4 shows an alternative form of the detection chamber, indicated by numeral 30', for the detection of signal images. That is to say, the detector maintains the spatial relationships of the signal photons throughout the detection process. To this end, the signal photons 26' enter the chamber 30' through a screen cathode 36' and are exposed to a sheet of photons 24' from the pump laser. Ionization takes place as previously described, either as a result of collisions with buffer gas atoms or as a result of collision with a different species of particles. In either case, the electrons generated as a result of ionization migrate through the detection chamber 30 through a microchannel plate 44, which maintains the spatial relationships of the original photons from which the electrons were generated, and are gathered by a segmented anode 38'.

Figure 5:
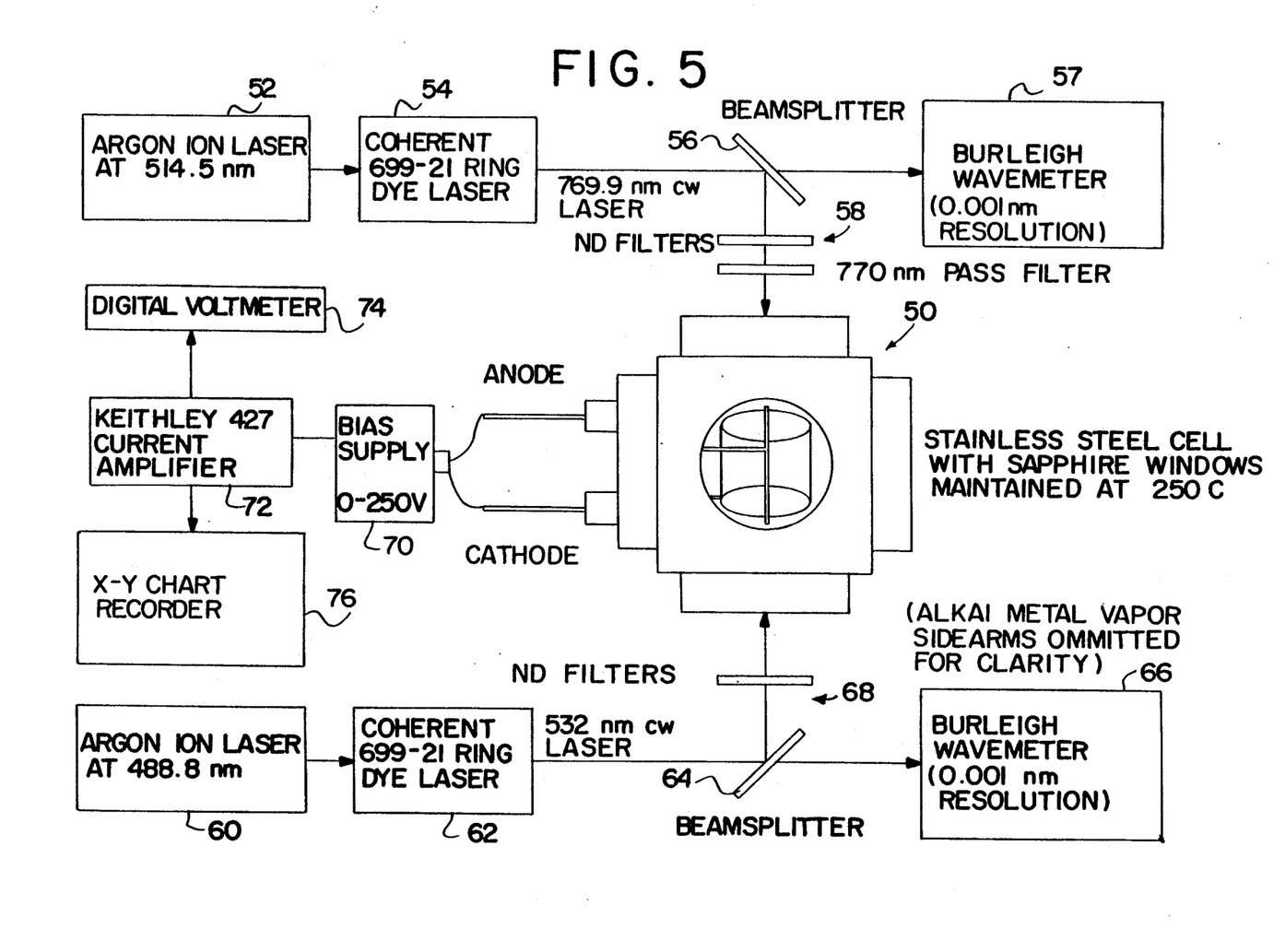
FIG. 5 is schematic view showing an experimental setup used in making the measurements shown in FIGS. 6-9.

FIG. 5 is an example of experimental test apparatus used to test the principle of the invention. The test apparatus includes a detection chamber 50 of stainless steel, with sapphire windows, maintained at a temperature of 250 degrees Celsius. A pump laser source is provided by components shown at in the top portion of the figure, including an argon ion laser 52, a coherent ring dye laser 54, a beam splitter 56, a wavemeter 57 to monitor the spectral content of the pump beam, and a 770 nm pass filter 58. The signal photons are provided by apparatus including another argon ion laser 60, another ring dye laser 62, another beam splitter 64, another wavemeter 66 and another filter 68. The signal photons produced are at nominally 532 nm wavelength. The other significant components of the apparatus are a voltage bias supply 70, a current amplifier 72, a digital voltmeter 74 and a chart recorder 76.

Figure 6:
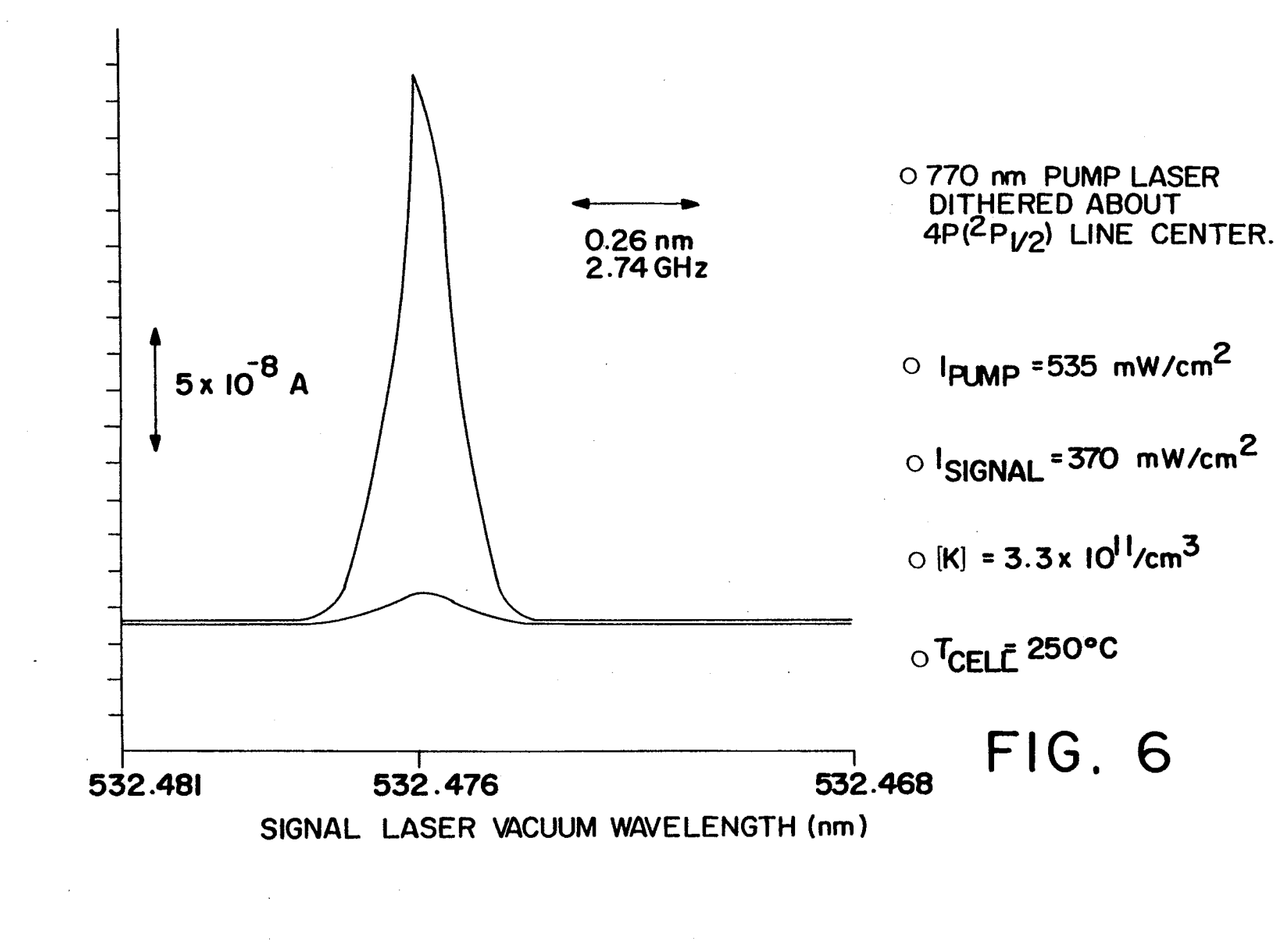
FIG. 6 is a graph showing the output current from the detector as a function of signal photon wavelength.
Figure 7:
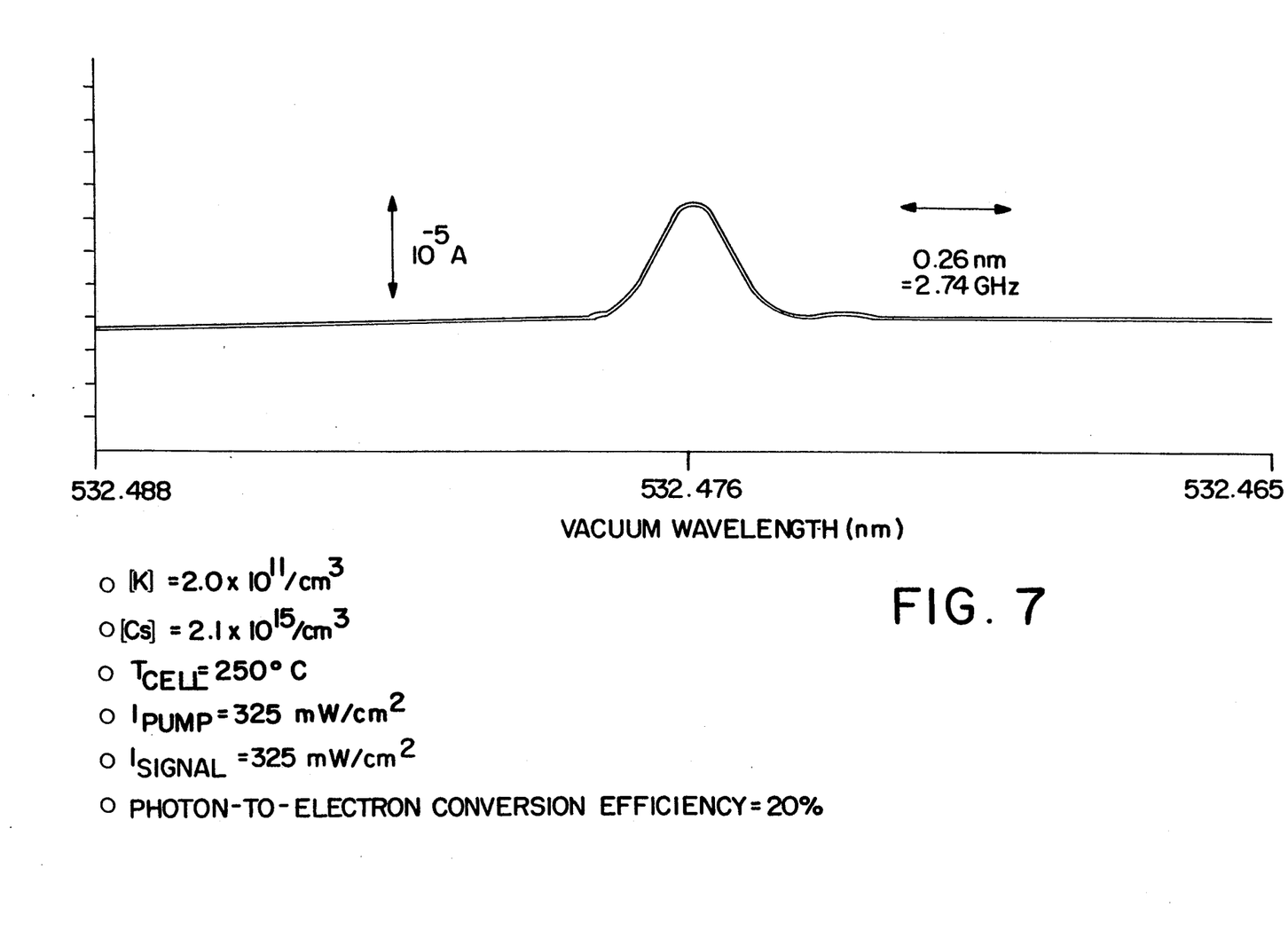
FIG. 7 is a graph showing the output current from the detector as a function of signal photon wavelength, when using cesium as a collision partner in the detector cell.

FIG. 6 shows the response of the test apparatus of FIG. 5 when the pump laser is dithered about the $4P(^2P_{\frac{1}{2}})$ line, using a pump beam intensity of approximately 535 mW/cm$^2$, a signal photon beam intensity of approximately 370 mW/cm$^2$, and a potassium concentration of $3.3 \times 10^{11}$/cm$^3$. FIG. 7 shows the response of the detection apparatus with the presence of cesium ($2.0 \times 10^{15}$/cm$^3$) as well as potassium ($2.0 \times 10^{11}$/cm$^3$), with a pump beam intensity and a signal photon beam intensity both of approximately 325 mW/cm$^2$. The photon-to-electron conversion efficiency is approximately 20%.

Figure 8:
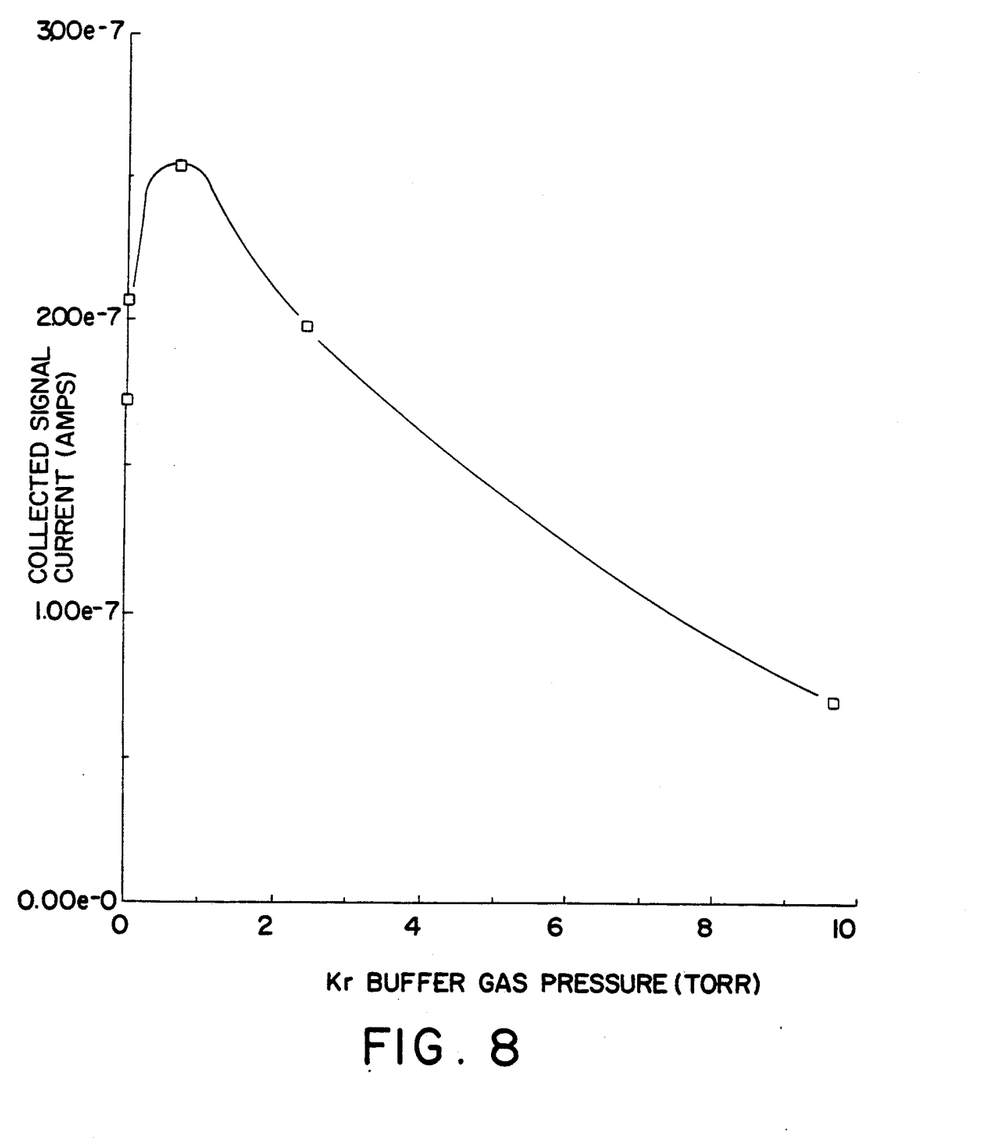
FIG. 8 is a graph showing the variation of output current of the detector as a function of buffer gas pressure in the detector cell.

FIG. 8 shows the effect of buffer gas pressure on the signal current output from the test apparatus. Although optimization has not been carried out, there is clearly an optimum value of buffer gas pressure for any given set of other operating conditions.

Figure 9:
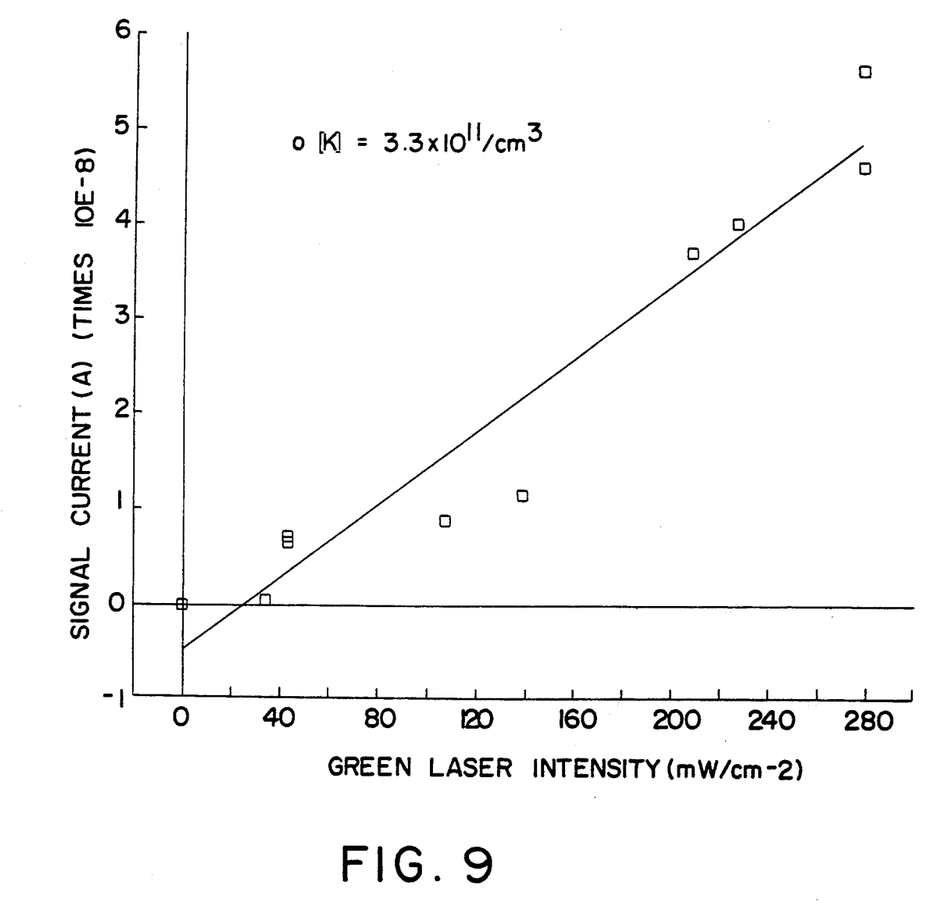
FIG. 9 is a graph showing the approximately linear variation of detector output current with signal photon intensity.

Finally, FIG. 9 shows that the output current from the test apparatus varies in a practically linear manner with the intensity of the signal photon beam.

It will be appreciated from the foregoing that the present invention represents a significant advance in the field of optical filters and detectors. In particular, the invention provides a filter/detector capable of detecting low levels of photon signals over a very narrow bandwidth, with a high efficiency and relatively low power consumption. Moreover, the use of a collision mechanism for ionization avoids the use of powerful electric fields or powerful optical sources for ionization. A low-power laser may still be usefully employed as a pump laser to populate a selected metastable state prior to ionization by collision. It will also be appreciated that, although multiple embodiments of the invention have been described in detail for purposes of illustration, various modifications may be made without departing from the spirit and scope of the invention. Accordingly, the invention is not to be limited except as by the appended claims.

I claim:

1. A narrow-bandwidth optical filter and detector, comprising:
  a chamber containing a selected atomic or molecular vapor;
  means for admitting into the chamber signal photons of a particular wavelength to be detected, as well as photons of other wavelengths, wherein the atomic or molecular vapor is selected to absorb only the signal photons and to produce atoms or molecules in a metastable state, in numerical proportion to the number of signal photons of the particular wavelength admitted into the chamber;
  means for admitting an inert buffer gas into the chamber, wherein collisions between the atomic particles of the buffer gas and the atoms or molecules in the metastable state cause ionization of a significant proportion of the atoms or molecules in the metastable state, and these collisions constitute a primary ionization mechanism of the filter and detector; and
  means for generating an electric field across the chamber and thereby collecting and detecting free electrons or ions as a measurable electric current proportional to the rate of admission of the signal photons.

2. A narrow-bandwidth optical filter and detector as defined in claim 1, wherein:
  the metastable state is reached in two transitional steps, including a first transitional step from a ground state to an intermediate state, and a second transitional step from the intermediate state to the metastable state;
  the filter and detector further includes a pump photon source, for effecting transition of the atoms or molecules in the chamber through one of the two transitional steps; and
  transition through the other of the transitional steps is effected by the absorption of signal photons.

3. A narrow-bandwidth optical filter and detector as defined in claim 2, wherein:
  the means for generating an electric field includes a segmented electrode to provide a spatial image corresponding to the spatial relationship of the signal photons incident on the filter.

4. A narrow-bandwidth optical filter and detector as defined in claim 1, wherein:
  the selected vapor is potassium; and
  the buffer gas is argon.

5. A narrow-bandwidth optical filter and detector as defined in claim 2, wherein:
  the selected vapor is potassium; and
  the buffer gas is argon.

6. A narrow-bandwidth optical filter and detector as defined in claim 3, wherein:
  the selected vapor is potassium; and
  the buffer gas is argon.

7. A narrow-bandwidth optical filter and detector as defined in claim 2, and further comprising:
  an optical prefilter positioned to limit incoming photons to have a selected energy range.

8. A narrow-bandwidth optical filter and detector, comprising:
  a chamber containing a first substance comprising a selected atomic or molecular vapor;
  means for admitting into the chamber signal photons of a particular wavelength to be detected, as well as photons of other wavelengths, wherein the atomic or molecular vapor is selected to absorb only the signal photons and to produce atoms or molecules in a metastable state, in numerical proportion to the number of signal photons of the particular wavelength admitted into the chamber;
  a second substance admitted into the chamber, wherein collisions between the atomic particles of the second substance and the atoms or molecules in the metastable state cause ionization of a significant proportion of the atoms or molecules of the second substance, and these collisions constitute a primary ionization mechanism of the filter and detector; and
  means for generating an electric field across the chamber and thereby collecting and detecting free electrons or ions as a measurable electric current proportional to the rate of admission of the signal photons.

9. A narrow-bandwidth optical filter and detector as defined in claim 8, wherein:
  the metastable state is reached in two transitional steps, including a first transitional step from a ground state to an intermediate state, and a second transitional step from the intermediate state to the metastable state;
  the filter and detector further includes a pump photon source, for effecting transition of the atoms or molecules in the chamber through one of the two transitional steps; and
  transition through the other of the transitional steps is effected by the absorption of signal photons.

10. A narrow-bandwidth optical filter and detector as defined in claim 9, wherein:
  the means for generating an electric field includes a segmented electrode to provide a spatial image corresponding to the spatial relationship of the signal photons incident on the filter.

11. A narrow-bandwidth optical filter and detector as defined in claim 9, and further comprising:
  an optical prefilter positioned to limit incoming photons to have a selected energy range.

12. A narrow-bandwidth optical filter and detector as defined in claim 8, wherein:
  the selected vapor is potassium; and
  the second substance is cesium.

13. A narrow-bandwidth optical filter and detector as defined in claim 9, wherein:
  the selected vapor is potassium; and
  the second substance is cesium.

14. A narrow-bandwidth optical filter and detector as defined in claim 10, wherein:
  the selected vapor is potassium; and
  the second substance is cesium.

15. A narrow-bandwidth optical filter and detector as defined in claim 11, wherein:
  the selected vapor is potassium; and
  the second substance is cesium.

16. A method of detecting signal photons at a selected narrow bandwidth and low signal level, comprising the steps of:
  selecting a first substance comprising an atomic or molecular system to provide absorption of signal photons of the desired wavelength;
  absorbing signal photons in a vapor cloud of the selected atomic or molecular system and thereby transforming atoms or molecules of the vapor from one state to a selected metastable state, in numerical proportion to the number of signal photons of the particular wavelength admitted into the chamber;

admitting a second substance into the chamber, to cause ionizing collisions between atoms or molecules in the selected metastable state and particles of the second substance, and these ionizing collisions constitute a primary ionization mechanism of the method; and collecting free electrons or ions that result from the ionizing collisions, to obtain an output current indicative of the rate of admission of the signal photons.

17. A method as defined in claim 16, wherein:

the step of admitting a second substance includes admitting a buffer gas into the chamber; and the ionizing collisions between particles in the metastable state and particles of the buffer gas cause ionization of the particles in the metastable state.

18. A method as defined in claim 16, wherein:

the metastable state is reached by two atomic transitions, only one of which is effected by the step of absorbing signal photons; and the method further comprises the step of generating pump photons to effect the other atomic transition.

19. A method as defined in claim 17, wherein:

the selected vapor is potassium; and the buffer gas is argon.

20. A method as defined in claim 16, wherein the second substance admitted into the chamber is an energy transfer partner for the selected first substance; and the ionizing collisions between particles in the metastable state and particles of the second substance cause ionization of the particles in the second substance.

21. A method as defined in claim 19, wherein:

the metastable state is reached by two atomic transitions, only one of which is effected by the step of absorbing signal photons; and the method further comprises the step of generating pump photons to effect the other atomic transition.

22. A method as defined in claim 20, wherein:

the selected vapor is potassium; and the second substance is cesium.

* * * * *